United States Patent [19]
Woolley

[11] Patent Number: 5,643,858
[45] Date of Patent: Jul. 1, 1997

[54] HIGH DENSITY AQUEOUS COMPOSITIONS

[75] Inventor: Graham Edward Woolley, Northwich, United Kingdom

[73] Assignee: Brunner Mond & Company Limited, Cheshire, United Kingdom

[21] Appl. No.: 284,638

[22] PCT Filed: Feb. 15, 1993

[86] PCT No.: PCT/GB93/00323

§ 371 Date: Sep. 14, 1994

§ 102(e) Date: Sep. 14, 1994

[87] PCT Pub. No.: WO93/16144

PCT Pub. Date: Aug. 19, 1993

[30] Foreign Application Priority Data

Feb. 15, 1992 [GB] United Kingdom ............ 9203271

[51] Int. Cl.⁶ ........................................ C09K 7/00
[52] U.S. Cl. ............... 507/140; 507/145; 507/272; 507/277; 507/269; 420/415; 420/513
[58] Field of Search ................. 507/140, 145, 507/272, 277, 269; 420/415, 513

[56] References Cited

U.S. PATENT DOCUMENTS

| | | |
|---|---|---|
| 4,046,197 | 9/1977 | Gruesbeck et al. |
| 4,455,241 | 6/1984 | Swanson. |
| 4,609,476 | 9/1986 | Heilweil. |
| 4,725,372 | 2/1978 | Teot et al. |

OTHER PUBLICATIONS

Database WPIL Abstract, Derwent Publications Ltd., London, GB; AN 81–73127D (40) & SU, A, 794 059 (Lengd Refrige Ind) 7, Jan. 1981.

Links, William F., Ph.D., Solubilities inorganic and metal –organic compounds A –Ir, A compliation of Solubility Data from the Periodical Literature, vol. 1, 4th ed., D. Van Nostrand Company, Inc., 1958, pp. 527–573.

McGlasson, R.L., Greathouse, W.D. and Hudgins, C.M., Stress Corrosion Cracking of Carbon Steels in Concentrated Sodium Nitrate Solutions, Corrosion —National Association of Corrosion Engineers vol. 16, Nov. 1960, pp. 557–561.

Hudgins, C.M., Landers, J.E., and Greathouse, W.D., Corrosion Problems in the Use of Dense Salt Solutions as Packer Fluids, Corrosion—National Association of Corrosion Engineers vol. 16, Nov. 1960, pp. 535–538.

*Primary Examiner*—Sharon Gibson
*Assistant Examiner*—Valerie Fee
*Attorney, Agent, or Firm*—Clifford W. Browning; Woodard, Emhardt, Naughton Moriarty & McNett

[57] ABSTRACT

Aqueous compositions for use as drilling fluids or as workover fluids/completion fluids comprise calcium chloride and calcium nitrate. The compositions have a density of at least 1.35 g cm$^{-3}$ and the weight ratio of calcium chloride to calcium nitrate is 5:95 to 95:5. The compositions may be formulated so as to have low crystallisation temperatures. Additional densifying agents such as calcium bromide and/or zinc bromide may also be included.

22 Claims, 2 Drawing Sheets

$CaCl_2 / Ca(NO_3)_2^*$

HIGH DENSITY AQUEOUS COMPOSITIONS

This application is filed under rule 371 of PCT/GB93/00323 filed Feb. 15, 1993.

The present invention relates to aqueous compositions containing calcium chloride intended for use particularly (but not exclusively) in the drilling of wells in subterranean formations, e.g. for oil or gas exploration/recovery.

BACKGROUND OF THE INVENTION

It is known to use a solution of calcium chloride (a so-called calcium chloride brine) as a fluid for use in the course of oil-well drilling, both as a drilling fluid and as a workover fluid/completion fluid after an oil-well is in production. However, solutions containing calcium chloride as the only dissolved salt have a maximum practical density of about 1.35 g/cm$^{-3}$ which may not be sufficiently high for drilling at great depths or into high pressure formations. To increase the density of calcium chloride solutions, it is known to include calcium bromide and/or zinc bromide but the zinc bromide component has acute environmental and economic disadvantages.

A further problem is that the low ambient temperatures encountered in oil/gas/hydrocarbon exploration in some areas of the world (e.g. the North Sea) can result in crystallisation of the calcium chloride from solutions containing more than 35% calcium chloride so that the fluid cannot be used.

U.S. Pat. No. 4,609,476 states that high density brine fluids for drilling operations may be solutions containing 10–60% by weight of salts such as $CaCl_2$, NaBr, NaCl, KSCN, $Ca(NO_3)_2$, $ZnCl_2$, $ZnBr_2$, $CaBr_2$, KI, LiCl. $CaI_2$, $Ca(SCN)_2$ and their mixtures having densities up to about 2.4 g/cc. Although one possible mixture which is covered by this statement would comprise calcium chloride and calcium nitrate, there is no specific disclosure of such a formulation in the patent and therefore no suggestion as to the relative proportions in which these two components would be used.

BRIEF SUMMARY OF THE INVENTION

According to a first aspect of the present invention there is provided an aqueous composition comprising water in which are dissolved calcium chloride and calcium nitrate wherein the composition has a density of at least 1.35 g cm$^{-3}$, and the weight ratio of calcium chloride to calcium nitrate is in the range 5:95 to 95:5 e.g. 5:95 to 85:15.

Although the compositions of the invention are defined as comprising dissolved calcium chloride and calcium nitrate, it should be appreciated that (at least in certain cases) it may be possible to formulate the compositions by dissolving other compounds which together provide the necessary calcium, chloride and nitrate ions. Therefore the terms dissolved calcium chloride and calcium nitrate are not to be construed as implying that calcium chloride per se and calcium nitrate per se have been used in preparation of the composition but rather that ions equivalent to those obtained by dissolution of calcium chloride and calcium nitrate are present in the solution. Thus, for example, in some cases compositions may be formulated by dissolution of sodium chloride and calcium nitrate.

The present invention has been based on our investigations of aqueous compositions comprising calcium chloride and calcium nitrate, and more particularly investigations to determine how the crystallisation temperature of such compositions varies with the formulation thereof. As a result of these investigations, we have established that it is possible to produce relatively high density formulations which have a predetermined crystallisation temperature provided that the relative amounts of calcium chloride and calcium nitrate are adjusted accordingly.

DETAILED DESCRIPTION OF THE INVENTIONS

The compositions may be formulated so that there is no substantial crystallisation above −10° C. Alternatively compositions may be formulated so as to crystallise only below −20° C., below −30° C., below −40° C., or below −50° C. as desired. Such formulations are therefore useful in those areas of the world where oil/gas/hydrocarbon exploration (or exploitation) is effected in low ambient temperature conditions. It is however also possible to formulate compositions which crystallise only below, say 10° C., or 20° C., or 30° C. and such compositions are useful in tropical or equatorial climates.

The actual density of the composition will be dependent on the total amount of calcium chloride and calcium nitrate in the composition. Generally the total amount of calcium chloride and calcium nitrate will be 35–70% by weight of the composition.

For any given density, the temperature at which crystallisation of the composition occurs will be dependent on the calcium chloride/calcium nitrate ratio. It may in fact be found that (for a given density) the same crystallisation temperature can be achieved at two different calcium chloride/calcium nitrate ratios. For one of such ratios, the amount of calcium chloride may be less than the amount of calcium nitrate whereas for the other ratio there is more nitrate than chloride.

In one embodiment of the invention, the dissolved calcium chloride and calcium nitrate together provide at least 90% by weight of dissolved solids in the composition, and the composition has a density of 1.35 to 1.65 g cm$^{-3}$. The density of 1.65 g cm$^{-3}$ is a practical maximum for a composition which contains only calcium chloride and calcium nitrate (optionally with a compatible soluble nitrate or chloride—see below) as the densifying agents since as the density approaches 17 g cm$^{-3}$ there is substantial crystallisation at ambient temperature. Below 1.35 g cm$^{-3}$ there is no practical advantage since densities up to 1.35 may readily be achieved using calcium chloride solutions.

Further examples of compositions which may be formulated in accordance with the invention have a density of 1.4 to 1.65 g cm$^{-3}$, e.g. 1.45 to 1.6. As a more specific range the composition may be formulated to have a density of 1.48 to 1.52 cm$^{-3}$, e.g. about 1.5 g cm$^{-3}$. A composition having a density of 1.45 to 1.65 g cm$^{-3}$ may be formulated with a calcium chloride:calcium nitrate weight ratio of 30:70 to 65:35 and may have a crystallisation temperature below −15° C. For a crystallisation temperature below −20° C., the composition may have a calcium chloride:calcium nitrate ratio range of 32:68 to 58:42.

The compositions of the invention may also incorporate at least one further compatible nitrate or chloride, particularly a soluble nitrate or soluble chloride. The amount of the compatible nitrate or chloride is preferably up to 20% by weight of that of the calcium nitrate (more preferably up to 10% by weight of the calcium nitrate). The preferred compatible nitrate which may be included is ammonium nitrate. The use of ammonium nitrate produces (for compositions containing a given amount of calcium chloride and calcium nitrate) a further depression in the crystallisation temperature. Examples of compatible chlorides which may be included are sodium chloride and ammonium chloride.

The calcium chloride and calcium nitrate used for preparing the compositions need not be pure. For example the calcium nitrate may contain up to 20% by weight of a compatible nitrate (e.g. of the type discussed above).

The calcium chloride may be provided for example, as a liquor containing up to 35% $CaCl_2$ or as a solid grade product.

Compositions in accordance with the invention which comprise calcium chloride, calcium nitrate and optionally a compatible nitrate are particularly advantageous in that they allow the production of compositions having a density of 1.35 to 1.65 g cm$^{-3}$ without the use of bromides (e.g. calcium bromide or zinc bromide) thereby avoiding the abovementioned environmental and economical disadvantages.

The aqueous compositions of the invention will generally be used as a drilling fluid or a workover fluid/completion fluid. When the composition is returned to the surface it will generally have undergone a reduction in density. It will generally be possible to re-densify the composition to a predetermined value (e.g. the original value) by addition of calcium chloride and/or calcium nitrate as necessary. Generally the "used" fluid will be re-densified by the addition of a mixture of calcium chloride and calcium nitrate (optionally also containing a soluble nitrate such as ammonium nitrate). This re-densifying mixture will generally be solid having a calcium chloride:calcium nitrate ratio of 5:95 to 95:5 (e.g. 10:90 to 90:10). The density of the re-densifying agent will depend on the amount of water of crystallisation present therein but will generally be in the range of 1.98 to 2.2. The re-densifying agent may be prepared by admixing solid calcium chloride and calcium nitrate or by co-dissolving calcium chloride and calcium nitrate and then re-crystallising the product. Typically the re-densifying agent used will have the same calcium chloride:calcium nitrate ratio as that employed in the original fluid.

For certain applications, the compositions of the invention may incorporate other densifying agents e.g. sodium chloride or a bromide such as zinc bromide and/or calcium bromide in situations where their use may original fluid.

For example, aqueous compositions comprising calcium chloride calcium nitrate, and calcium bromide (optionally also incorporating a compatible soluble chloride or nitrate, e.g. ammonium nitrate) may be formulated to a density range of 1.35 to 1.84 g cm$^{-3}$, more preferably 1.4 to 1.82 g cm$^{-3}$. The incorporation of calcium bromide has been found to produce a synergistic effect in that it allows higher density compositions with lower freezing points to be produced. Heretofore density ranges of 1.66 to 1.84 g cm$^{-3}$ have only been obtained by the incorporation of zinc bromide which is environmentally disadvantageous due to the zinc content.

Such formulations will typically comprise 20-40% by weight of calcium bromide, 12-30% by weight calcium nitrate, and 5-25% by weight of calcium chloride, optionally also containing a compatible soluble chloride or nitrate, e.g. ammonium nitrate. Typically the weight ratio of calcium nitrate:calcium chloride will be 80:20 20:80, more typically 65:35 to 35:65. It will generally be preferred that the amount by weight of the calcium nitrate exceeds that of the calcium chloride. Additionally the weight ratio of calcium bromide to the total weight of calcium nitrate and calcium chloride will typically be in the range 70:30 to 30:70.

Such formulations may be re-densified after use by admixture with a solid composition comprising the requisite amount of calcium chloride, calcium nitrate, and/or calcium bromide (e.g. in the same proportions as in the original formulation).

Compositions of higher density, e.g. up to 2.3 g cm$^{-3}$ may be obtained using formulations comprising calcium chloride, calcium nitrate, calcium bromide and the zinc bromide (and optionally also including a compatible nitrate or chloride). Although admixtures of calcium bromide and zinc bromide (without inclusion of calcium nitrate and calcium chloride) may be used for producing compositions having densities of 1.8-2.3 and relatively low crystallisation temperatures, such compositions have relatively high zinc content. The present invention allows the production of compositions having densities of 1.7 to 2.3 (e.g. 1.7 to 2.29) but including lower zinc contents. This is particularly advantageous in that zinc is environmentally unacceptable and the liquor must generally be treated for removal of zinc before it can be disposed of. Therefore lower amounts of zinc have the advantage of lower treatment costs.

Compositions described in the preceding paragraph may be produced from commercially available zinc bromide (which additionally contains calcium bromide together with calcium chloride and calcium nitrate. For convenience, the composition may also be formulated by admixing a calcium bromide containing composition having a density of 1.66 to 1.84 (see above) with the aforementioned commercially available zinc bromide.

Such formulations may be re-densified after use by admixture with calcium chloride, calcium nitrate, calcium bromide, and/or zinc bromide in the requisite amounts (e.g. in the same proportions as in the original composition).

It is also possible for the compositions to incorporate pH and/or viscosity modifying agents and/or corrosion inhibitors (e.g. as conventionally used to prevent corrosion in compositions containing calcium chloride or calcium bromide).

The present invention has been derived by investigating the crystallisation temperatures (measured as described later) of calcium chloride/calcium nitrate solutions of a given density across a range of calcium chloride:calcium nitrate weight ratios (from 100:0 to 0:100).

Thus for a solution of given density (obtained by dissolving in water sufficient calcium chloride and calcium nitrate in the requisite ratio) it is possible to plot crystallisation temperature vs calcium chloride: calcium nitrate ratio.

Using this approach, unexpectedly low crystallisation temperatures have been discovered at relatively high densities (i.e. 1.35 g cm$^{-3}$ to 1.65 g cm$^{-3}$ more preferably 1.40 to 1.60 g cm$^{-3}$) as will be shown with reference to the drawings accompanying this application (as described later).

BRIEF DESCRIPTION OF DRAWINGS

The invention will be further described by way of example only with reference to the accompanying drawings, in which.

Figure 1:
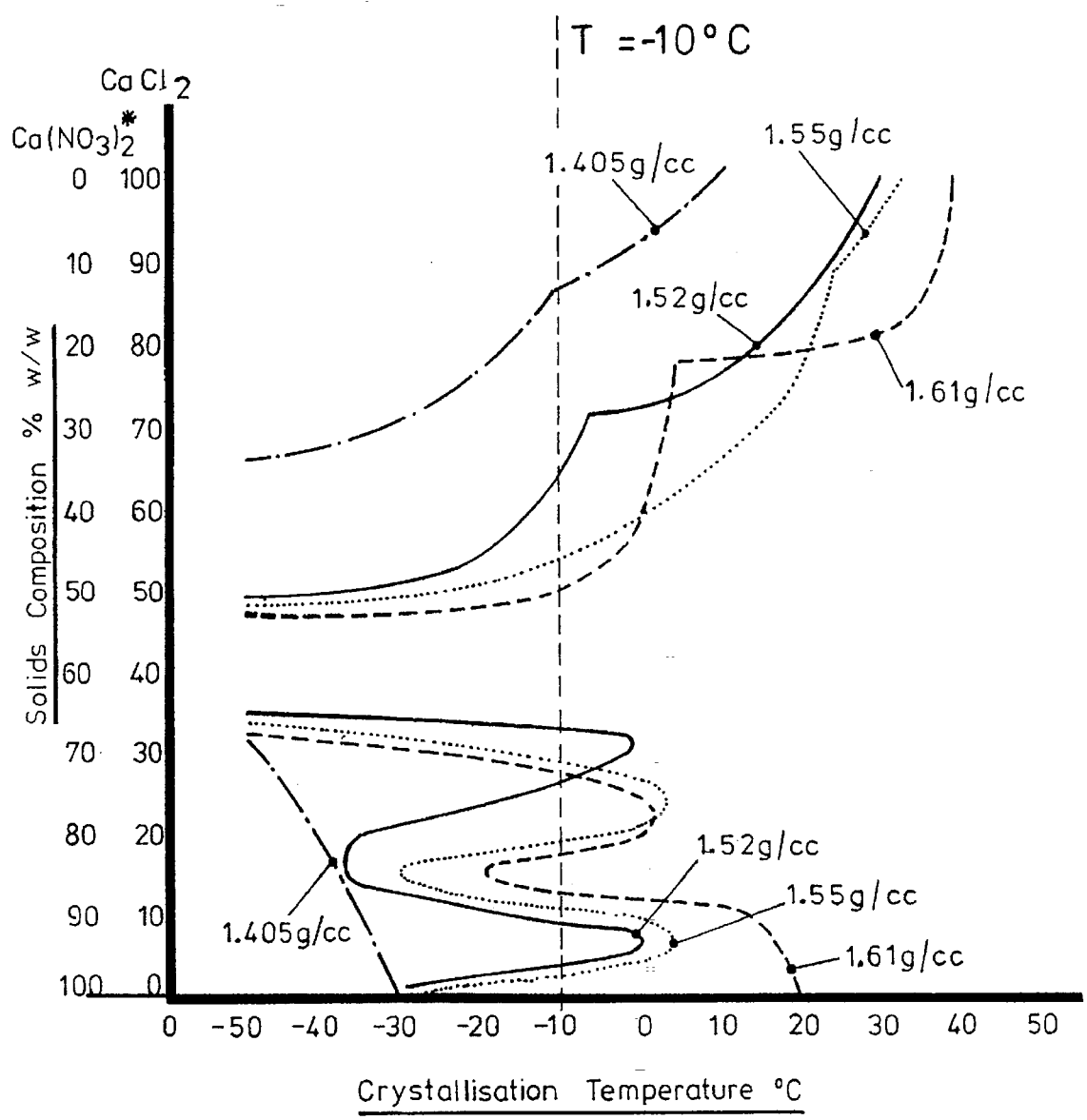
FIG. 1 is a plot illustrating crystallisation temperatures for a range of calcium chloride/calcium nitrate formulations.

The data plotted in FIG. 1 represents the results of investigations to determine how the crystallisation temperature of compositions having a particular density varies with the relative amounts of calcium chloride and calcium nitrate in the composition The calcium nitrate was provided by a commercially available product comprising 79% calcium nitrate, 15% water, and 6% ammonium nitrate.

For the purposes of FIG. 1, the calcium chloride: calcium nitrate ratios are calculated on the basis of the total amount of nitrate provided by the commercial grade calcium nitrate (i.e. "actual" calcium nitrate (79% by weight of commercial grade product) plus ammonium nitrate (6% by weight of commercial product) For this reason, the calcium nitrate values in FIG. 1 are depicted by $Ca(NO_3)_2$*.

For the purposes of FIG. 1, the behaviour of compositions of four different densities has been illustrated the densities being 1.405 g $cm^{-3}$, 1.52 g $cm^{-3}$, 1.55 g $cm^{-3}$ g and 1.61 g $cm^{-2}$. For each of the four densities, a range of compositions was produced by varying the ratio (by weight) of calcium chloride to calcium nitrate over the range 0.100 to 100.0.

Referring now to FIG. 1, all formulations to the left of the line T=−10° C. have a crystallisation temperature below −10° C. For example, it can be seen that a formulation having a density of 1.405 g $cm^{-3}$ and a crystallisation temperature below −10° C. may be produced over a $CaCl_2:Ca(NO_3)_2$* range of about 5:95 to 85:15. The exact crystallisation temperature within this composition range depends on the actual $CaCl_2:Ca(NO_3)_2$* ratio. For example, with a $CaCl_2:Ca(NO_3)_2$* ratio in the range of about 30:70 to about 65:35 it is possible to produce compositions which do not crystallise above −50° C.

In the case of compositions having a density of 1.61 g $cm^{-3}$, the $CaCl_2:Ca(NO_3)_2$* range for achieving a crystallisation temperature below −10° C. is about 28:72 to about 48:52 (a narrower range than for densities of 1.405 g $cm^{-3}$). Compositions which do not crystallise above −50° C. can be achieved in the $CaCl_2:Ca(NO_3)_2$ range of about 32:68 to about 48:52. As the temperature of such solutions is lowered below 0° C. down toward −50° C. there is an increase in viscosity but no crystallisation. It will also be noted that there is also a crystallisation temperature minimum at a $CaCl_2:Ca(NO_3)_2$* ratio of about 15:85 which provides further possibilities for producing formulations crystallising only below −10° C.

The curves in FIG. 1 for compositions having densities of 1.52 g $cm^{-3}$ and 1.55 g $cm^{-3}$ may be interpreted in a similar manner.

It will be appreciated that in general, a drilling fluid as required for a particular application will be of a specified density and formulated so as not to crystallise above a certain temperature. It is a simple matter to formulate solutions of the required density over a range of $CaCl_2:Ca(NO_3)$ ratios and thereby obtain (for compositions of that density) a plot similar to that shown in FIG. 1. From the plot so obtained, the optimum range of $CaCl_2:Ca(NO_3)_2$ ratios for the particular application may be selected.

Figure 2:
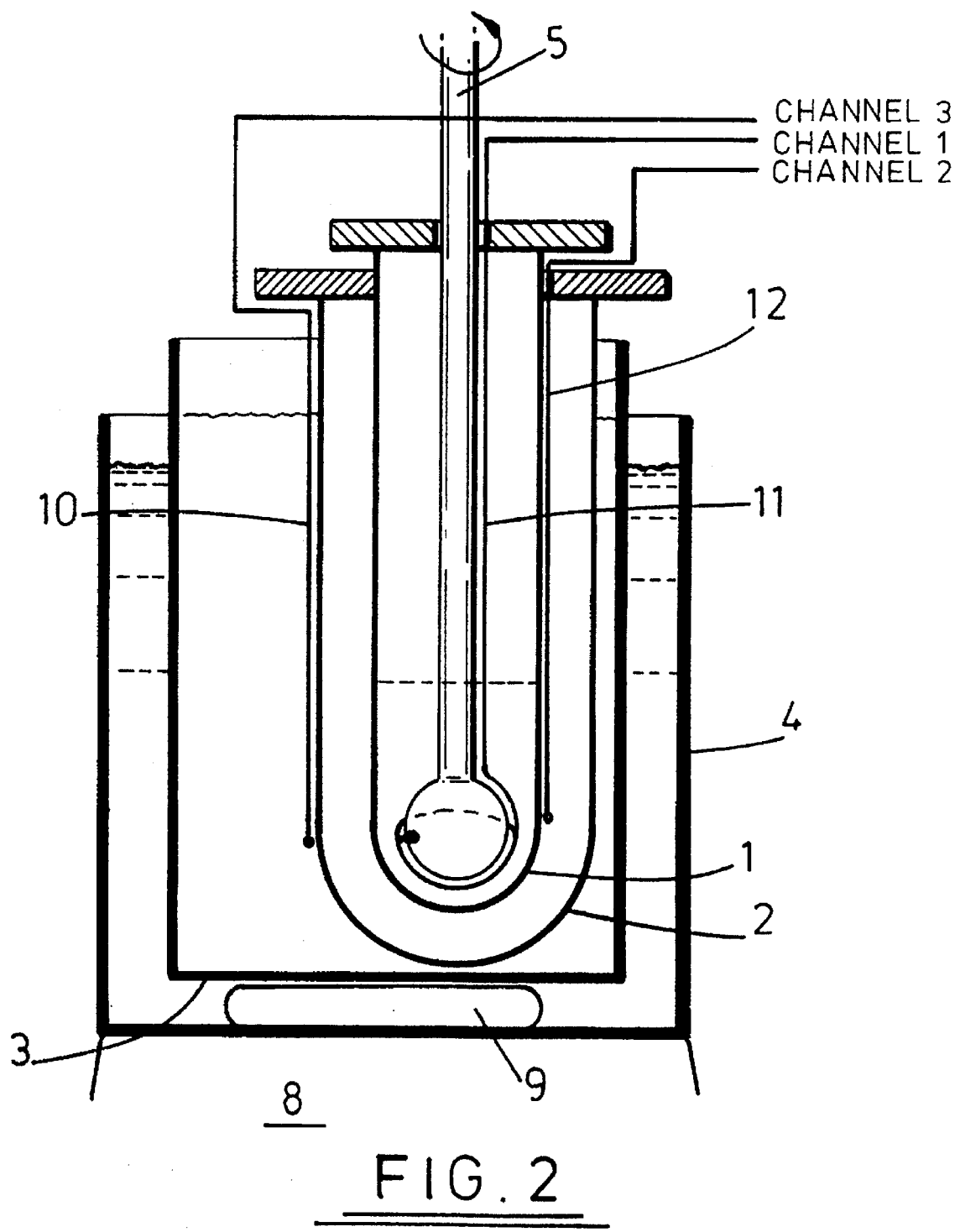
FIG. 2 illustrates the apparatus with which the crystallisation temperature plotted in FIG. 1 was measured.

FIG. 2 illustrates the apparatus used for measuring crystallisation temperature. The apparatus comprises a glass sample tube 1 which locates within a glass air jacket 2 which itself locates within a vessel 3 provided in a further vessel 4. The glass sample tube has inner and outer diameters of 2.2 and 2.6 cm respectively. The glass air jacket 2 has inner and outer diameters of 4.0 cm and 4.6 cm respectively.

DETAILED DESCRIPTION

A glass agitator 5 is provided in the sample tube 2 with approximately 0.1 cm clearance between its bulbous end and the inner surface of tube 1. Foam insulating collars 6 and 7 are provided as shown. The whole apparatus is seated on a magnetic stirrer 8 and a magnetic follower 9 is provided within a vessel 4.

Thermocouple leads 10–12 are arranged as shown and are connected as illustrated to channels 1–3 of a KM1420 data logger. The end of thermocouple lead 11 forms a loop around the end of glass stirrer 5. The thermocouple are NiCr+, NiAl−.

To measure crystallisation temperature, the apparatus is thoroughly cleaned and dried. Ethylene glycol is contained in outer vessel 4. Approximately 10–15 $cm^3$ of sample mixture together with a bentonite seed is placed in sample tube 1 and gently agitated with the stirrer 8 ensuring that the loop of the thermocouple 11 is completely immersed. Agitation is continued for 10 minutes to allow air bubbles to be expelled.

Solid carbon dioxide pellets are then placed in vessel 3 to surround the air jacket 2 to a level approximately 5 cm above the level of the sample solution and the data logger is immediately started.

The sample is agitated gently with the glass stirrer 5 ensuring that no air bubbles enter the sample solution.

The crystallisation temperature of the solution is that temperature at which a white or opaque solid appears accompanied by a sudden, usually large increase in temperature.

The invention is further illustrated with reference to the following non-limiting Examples.

EXAMPLE 1

The Example illustrates the formulation of compositions of various densities and crystallisation temperatures (TCT) using calcium chloride and calcium nitrate.

| Density (g $cm^{-3}$) | TCT | % $CaCl_2$ | % $Ca(NO_3)_2$* |
| --- | --- | --- | --- |
| 1.4 | 0° C. | 37 | 3.5 |
| 1.4 | −10° C. | 35 | 5.5 |
| 1.4 | −20° C. | 32 | 8.5 |
| 1.5 | 0° C. | 34.5 | 14.0 |
| 1.5 | −10° C. | 33.0 | 15.5 |
| 1.5 | −20° C. | 29.2 | 19.3 |
| 1.6 | 0° C. | 31.0 | 26.0 |
| 1.6 | −10° C. | 29.0 | 28.0 |
| 1.6 | −20° C. | 27.5 | 29.5 |
| 1.65 | −10° C. | 19.7 | 41.0 |
| 1.7 | 0° C. | 20.8 | 43.3 |

*As defined above

EXAMPLE 2

This Example illustrates the formulation of compositions of various densities and crystallisation temperatures (T.C.T.) using calcium chloride, calcium nitrate and calcium bromide.

| Composition | | | | |
| --- | --- | --- | --- | --- |
| $CaBr_2$ | $Ca(NO_3)_2$* | $CaCl_2$ | T.C.T. (°C.) | Density |
| 32.5 | 20.8 | 12.9 | −9.6 | 1.8183 |
| 37.5 | 17.4 | 10.7 | −21 | 1.8177 |
| 34.4 | 19.1 | 11.9 | −14 | 1.815 |
| 24.5 | 23.6 | 22 | −13 | 1.814 |
| 33.1 | 21.35 | 13.1 | −14 | 1.7963 |
| 36.7 | 17 | 10.5 | −13 | 1.7936 |
| 36.2 | 17.0 | 10.5 | −13 | 1.788 |
| 36.2 | 17 | 10.5 | −14 | 1.7852 |
| 35.6 | 16.5 | 10.2 | −10 | 1.7758 |
| 36.7 | 14.2 | −13.2 | −6 | 1.7755 |
| 27.5 | 25.5 | 8.2 | 17 | 1.72 |
| 26.1 | 24.2 | 7.8 | −11 | 1.75 |
| 32.3 | 17.0 | 10.5 | −21 | 1.7281 |
| 23.5 | 17 | 16.2 | −10.5 | 1.697 |

Thus, for example, the solution of density 1.815 g $cm^3$ in the above column may be prepared by dissolving together: $Ca(NO3)2$*:54:6 g (85% w/w) (i.e. 79% w/w $Ca(NO_3)_2$+6% w/w $NH_4NO_3$)

CaCl2 :36.4 g (79% w/w)
CaBr2 :145.5 g (1.71 g/cm³)

EXAMPLE 3

This Example illustrates the formulation of compositions of various densities and crystallisation temperatures (T.C.T.) using calcium chloride, calcium nitrate, calcium bromide and zinc bromide.

| Composition | | | | | |
|---|---|---|---|---|---|
| % w/w ZnBr₂ | % w/w CaBr₂ | % w/w Ca(NO₃)₂* | % w/w CaCl₂ | T.C.T. (°C.) | DENSITY |
| **21.3 | 40 | — | — | −52 | 1.9 |
| **52.8 | 22.8 | — | — | −12 | 2.3 |
| 12.1 | 31.0 | 15.3 | 9.5 | −19 | 1.915 |
| 12.1 | 31.1 | 15.3 | 9.5 | −14.0 | 1.9 |
| 18.7 | 24.1 | 15.5 | 8.1 | −17.5 | 1.9042*** |
| 18.1 | 24.9 | 15.6 | 9.7 | −17.5 | 1.9099** |

**Comparative

Compositions in accordance with the invention may be prepared by admixing a commercially available zinc bromide solution (which contains 52.8 g ZnBr₂ and 22.8 g CaBr₂ per 100 g solution) with a further solution having a density of 1.81–1.82 g cm⁻³ which contains 34 g CaBr₂, 19 g Ca(NO₃)₂* and 12 g CaCl₂ per 100 g of solution.

Thus, for example, a solution of density 1.9 g cm⁻³ may be prepared by admixing:

22.2 g of the ZnBr₂ solution
77.8 g of the solution of density 1.81–1.82 g cm⁻³.

The following data illustrates dilution of dense solutions and subsequent re-densification.

| INITIAL | DENSITY | | RE-DENSIFICATION | |
|---|---|---|---|---|
| DENSITY | +10 ml H₂O | +25 ml H₂O | DENSITY | TCT(°C.) |
| 1.8970 | 1.8239 | — | 1.9099*** | −17.5 |
| 1.9 | 1.8227 | 1.725 | 1.9042*** | −14.5 |

Dense solution A was of the following approx. 1.9 g/cm³ of composition;

ZnBr₂:11.5% w/w
CaBr₂:31% w/w
Ca(NO₃):15.3% w/w
CaCl₂:9.5% w/w

Dilution of 171 g of solution A with 10 cm³ water gave solution B of density 1.823–1.824

Re-densification of 181 g solution B was effected with:
44.5 g ZnBr₂/CaBr₂ solution (100 g contains 52.8 g ZnBr₂ and 22.8 g CaBr₂)
15.35 g Ca(NO₃)₂ (85% w/w)
10.23 g CaCl₂ (79% w/w).

I claim:

1. An aqueous composition comprising dissolved calcium chloride and calcium nitrate wherein the composition has a density of at least 1.40 g cm⁻³, the weight ratio of calcium chloride to calcium nitrate is 5:95 to 95:5, the composition contains at least 12% by weight of the calcium nitrate, and the composition is so formulated that there is no substantial crystallization of the composition above 20° C.

2. An aqueous composition as claimed in claim 1 wherein the calcium chloride and calcium nitrate together provide at least 90% by weight of dissolved solids in the composition, and wherein the composition has a density of 1.35 to 1.65 g cm⁻³.

3. A composition as claimed in claim 1 wherein the weight ratio of calcium chloride to calcium nitrate is 5:95 to 85:15.

4. A composition as claimed in claim 1 formulated to have a density of 1.4 to 1.65 g cm⁻³.

5. A composition as claimed in claim 1 having a density of 1.45 to 1.65 g cm⁻³ and a calcium chloride:calcium nitrate weight ratio of 30:70 to 65:35.

6. A composition as claimed in claim 5 formulated to have a crystallisation temperature below −15° C.

7. A composition as claimed in claim 5 formulated to have a crystallisation temperature below −20° C. and having a calcium chloride:calcium nitrate ratio range of 32:68 to 58:42.

8. A composition as claimed in claim 5 having a density of 1.48 to 1.52 g cm⁻³ and having a calcium chloride:calcium nitrate ratio range of 40:60 to 60:40.

9. An aqueous composition comprising dissolved calcium chloride, calcium nitrate and at least one additional densifying agent, said composition having a density of at least 1.40 g cm⁻³ and having a weight ratio of calcium chloride to calcium nitrate of 5:95 to 95:5.

10. A composition as claimed in claim 1 wherein the weight ratio of calcium chloride to calcium nitrate is 5:95 to 85:15.

11. A composition as claimed in claim 9 wherein the additional densifying agent is a bromide.

12. A composition as claimed in claim 11 wherein the bromide is calcium bromide and/or zinc bromide.

13. A composition as claimed in claim 12 wherein the additional densifying agent is calcium bromide and the composition has a density of 1.66 to 1.84 g cm⁻³.

14. A composition as claimed in claim 13 comprising 20–40% by weight of calcium bromide, 12–30% by weight calcium nitrate, and 5–25% by weight of calcium chloride.

15. A composition as claimed in claim 13 wherein the amount by weight of the calcium nitrate exceeds that of the calcium chloride.

16. A composition as claimed in claim 13 wherein the weight ratio of calcium bromide to the total weight of calcium nitrate and calcium chloride is in the range of 70:30 to 30:70.

17. A composition as claimed in claim 12 comprising calcium bromide and zinc bromide as additional densifying agents and having a density of 1.7 to 2.3 g cm$^{-3}$.

18. A composition as claimed in claim 1 or 9 additionally incorporating at least one further compatible nitrate.

19. A composition as claimed in claim 18 wherein the amount of the compatible nitrate is present in an amount up to 20% by weight of the calcium nitrate.

20. A composition as claimed in claim 1 or 9 so formulated that there is no substantial crystallisation of the composition above −50° C.

21. A solid material for use in formulating or re-densifying a composition as claimed in claim 1 or 9, the material comprising calcium chloride and calcium nitrate in a weight ratio of calcium chloride:calcium nitrate of 5:95 to 95:5 and the material having a density of 1.98 to 2.2.

22. A composition as claimed in claim 1 or 9, further comprising a corrosion inhibitor.

* * * * *

UNITED STATES PATENT AND TRADEMARK OFFICE
CERTIFICATE OF CORRECTION

PATENT NO. : 5,643,858
DATED : July 1, 1997
INVENTOR(S) : Graham Edward Woolley

It is certified that error appears in the above-identified patent and that said Letters Patent is hereby corrected as shown below:

In column 5, line 57, please delete "A glass agitator 5 is provided in the sample tube 2" and insert in lieu thereof -- A glass agitator 5 is provided in the sample tube 1--.

Signed and Sealed this

Sixth Day of January, 1998

Attest:

BRUCE LEHMAN

Attesting Officer

Commissioner of Patents and Trademarks